US 6,603,790 B1

(12) United States Patent
Kodeda et al.

(10) Patent No.: US 6,603,790 B1
(45) Date of Patent: Aug. 5, 2003

(54) GAS LASER AND A DEDUSTING UNIT THEREOF

(76) Inventors: Hans Kodeda, Veichtederpointweg 27, Landshut 84036 (DE); Helmut Frowein, Bierbaumstr. 1a, Munich 81243 (DE); Claus Strowitzki, Megginhardstr. 1, Gilching 82205 (DE); Alexander Hohla, Neureutherstr. 32, Munich 80798 (DE)

( * ) Notice: Subject to any disclaimer, the term of this patent is extended or adjusted under 35 U.S.C. 154(b) by 0 days.

(21) Appl. No.: 09/511,649

(22) Filed: Feb. 22, 2000

(51) Int. Cl.⁷ .............................. H01S 3/03; H01S 3/22
(52) U.S. Cl. ............................ 372/59; 372/61; 372/55; 372/57; 372/60; 372/81; 372/82; 372/87
(58) Field of Search ............................. 372/55, 61, 57, 372/87, 59, 60, 82, 81

(56) References Cited

U.S. PATENT DOCUMENTS

| | | | |
|---|---|---|---|
| 3,400,596 A | 9/1968 | Laich | 74/89.23 |
| 3,753,144 A | 8/1973 | Kearns et al. | 372/35 |
| 3,877,794 A | 4/1975 | Kulle et al. | 350/187 |
| 3,886,474 A | 5/1975 | Hensolt et al. | 372/107 |
| 4,423,510 A | 12/1983 | Pack et al. | 372/56 |
| 4,448,385 A | 5/1984 | Matthys | 248/476 |
| 4,534,034 A | 8/1985 | Hohla et al. | 372/59 |
| 4,541,848 A | 9/1985 | Masuda et al. | 361/235 |
| 4,638,486 A | 1/1987 | Dost et al. | 372/107 |
| 4,686,685 A | 8/1987 | Hoag | 372/107 |
| 4,744,091 A | 5/1988 | Gorisch et al. | 372/107 |
| 4,746,201 A | 5/1988 | Gould | 350/394 |
| 4,769,824 A | 9/1988 | Seki | 372/107 |
| 4,891,818 A | 1/1990 | Levatter | 372/57 |
| 5,029,177 A | * 7/1991 | Akins et al. | 372/57 |
| 5,268,923 A | 12/1993 | Welsch et al. | 372/107 |
| 5,319,663 A | * 6/1994 | Reid et al. | 340/825.52 |
| 5,373,523 A | * 12/1994 | Fujimoto et al. | 372/103 |
| 5,438,587 A | 8/1995 | Kinley | 372/86 |
| 5,473,162 A | 12/1995 | Busch et al. | 250/339.08 |
| 5,540,001 A | * 7/1996 | Bouretz et al. | 34/591 |

(List continued on next page.)

FOREIGN PATENT DOCUMENTS

| | | | |
|---|---|---|---|
| DE | 31 30 399 A1 | 2/1983 | |
| DE | 32 12928 C2 | 10/1983 | |
| DE | 37 10 525 C2 | 10/1987 | |
| DE | 3718467 A | 12/1988 | H01S/3/86 |
| DE | 297 15 466 U1 | 10/1997 | |
| DE | 198 40 035 A1 | 4/1999 | |
| EP | 0456875 A | 11/1991 | H01S/3/86 |
| JP | 2250383 | 10/1990 | H01S/3/86 |
| JP | 05067823 | 3/1993 | |
| JP | 5152643 A | 6/1993 | H01S/3/34 |
| JP | 06237034 | 8/1994 | |

OTHER PUBLICATIONS

Kodeda, et al., "Adjustable Mounting Unit for an Optical Element of a Gas Laser," U.S. patent application Ser. No. 09/511,648 filed Feb. 22, 2000 (Status: pending).

(List continued on next page.)

*Primary Examiner*—Quyen Leung
*Assistant Examiner*—Delma R. Flores Ruiz
(74) *Attorney, Agent, or Firm*—Ivor R. Elrifi; Mintz Levin Cohn Ferris Glovsky & Popeo, PC

(57) ABSTRACT

A gas laser and a dedusting unit thereof are provided. The gas laser comprises a tube containing a gas mixture including a laser gas and preferably a buffer gas. The tube preferably comprises a cylindrical inner wall. A discharge unit is inserted into the tube and has two elongated electrodes defining an electrical gas discharge gap therebetween for providing an electric gas discharge between said electrodes to generate laser light. A circulation means is included in the tube for generating a gas flow within the tube that passes through the discharge gap. A dedusting unit is mounted along the inner cylindrical wall of the tube in such a manner that only a bypass flow which is a part of the gas flow within the tube passes through the dedusting unit.

23 Claims, 5 Drawing Sheets

U.S. PATENT DOCUMENTS

| | | | |
|---|---|---|---|
| 5,585,641 A | 12/1996 | Sze et al. | 250/492.1 |
| 5,591,317 A | 1/1997 | Pitts, Jr. | 204/667 |
| 5,729,564 A | 3/1998 | Cullumber | 372/58 |
| 5,748,663 A | 5/1998 | Chenausky | 372/55 |
| 5,771,258 A | 6/1998 | Morton et al. | 372/57 |
| 5,857,775 A | 1/1999 | Vodzak et al. | 374/121 |
| 6,018,537 A | 1/2000 | Hofmann et al. | 372/102 |
| 6,151,346 A | 11/2000 | Partlo et al. | 372/38.02 |
| 6,192,061 B1 | 2/2001 | Hart et al. | 372/107 |
| 6,208,674 B1 | 3/2001 | Webb et al. | 372/55 |
| 6,359,922 B1 | 3/2002 | Partlo et al. | 372/57 |
| 6,363,094 B1 | 3/2002 | Morton et al. | 372/58 |

OTHER PUBLICATIONS

Kodeda, et al., "An Optical Element Holding and Extraction Device," U.S. patent application Ser. No. 09/510,666 filed Feb. 22, 2000 (Status: pending).

Strowtizki, et al. "Gas Laser Discharge Unit," U.S. patent application Ser. No. 09/510,539 filed Feb. 22, 2000 (Status: pending).

Strowitzki, "Dedusting Unit for a Laser Optical Element of a Gas Laser and Method For Assembling," U.S. patent application Ser. No. 09/510,667 filed Feb. 22, 2000 (Status: pending).

Strowitzki, et al., "Shadow Device for a Gas Laser, " U.S. patent application Ser. No. 09/510,017 filed Feb. 22, 2000 (Status: pending).

Strowitzki, et al., "Modular Gas Laser Discharge Unit," U.S. patent application Ser. No. 09/510,538 filed Feb. 22, 2000 (Status: pending).

\* cited by examiner

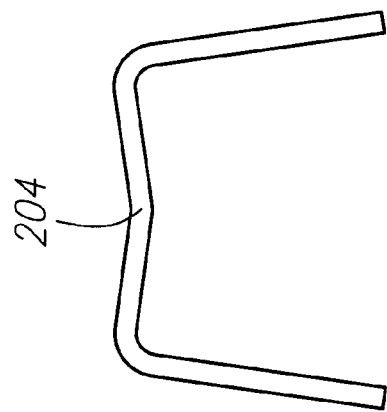
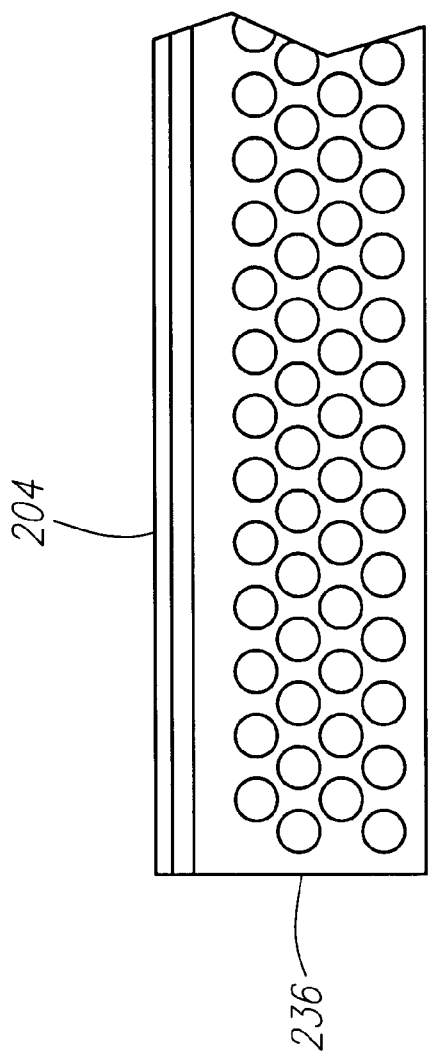

GAS LASER AND A DEDUSTING UNIT THEREOF

BACKGROUND OF THE INVENTION

The invention relates to a gas laser and a dedusting unit thereof for removing dust particles generated during normal laser operation from a gas mixture within the gas laser containing a laser gas and a buffer gas.

Gas lasers are generally known in the art wherein a laser gas is excited by an electrical power source to generate a longitudinal discharge of light. In a typical structure, the laser gas is contained within a tube having a laser discharge zone defined therein between a pair of laser electrodes. The laser gas is excited by applying a relatively high voltage, resulting in the generation of light that can be directed by appropriate optic elements to provide a laser beam. The laser is normally operated or fired in a pulsed manner by connecting a main electrode circuit to the electrical power source at a selected operating frequency. A circulation fan is commonly provided within the laser tube for circulation of the gas mixture through the laser discharge zone.

During laser operation, dust particles are generated within the tube, particularly in an excimer laser. These dust particles are produced by a combination of erosion of metal and insulator material components such as the electrodes in the laser discharge zone, and chemical corrosion of said components by the aggressive laser gas. Dust within the gas has to be avoided since it diffuses the light resonating in the gas discharge gap between the electrodes, thereby lowering the laser light output power significantly. Moreover, the dust particles can accumulate on the optic elements, resulting in potentially significant reduction in the power of the light beam discharged from the tube.

A variety of dust particle filtration systems have been proposed in an effort to reduce the impact of dust particle generation on laser operation. From DE-C-32 12 928 a gas laser is known, in which an external electrical dedusting device is mounted to remove dust particles from the laser gas. Such systems, however, are relatively complex with respect to the assembly of structural components and related circulation of the laser gas to and from the laser housing. U.S. Pat. No. 5,319,663 describes a gas laser including an electrostatic dedusting device directly mounted within the laser housing for flow-through gas circulation during laser operation. However, these devices have not been highly efficient in operation, typically collecting only a small proportion of the generated dust entrained within the gas flow stream during each pass therethrough. Moreover, since the whole gas flow circulating within the tube has to pass through this electrostatic dedusting unit, undesired turbulences are generated within the gas flow. Further, U.S. Pat. No. 5,729,564 discloses a gas discharge laser within a housing that accommodates an electrostatic precipitator for flow-through passage of the laser gas circulated by a fan. However, since the entire flow passes the precipitator, turbulences are generated within the gas flow during the laser operation. Additionally, the precipitator has a large sized structure and, therefore, requires too much space within the housing.

RELATED APPLICATIONS

The present invention may be used in conjunction with the inventions described in the patent applications identified below and which are being filed simultaneously with the present application:

| Docket No. | Title | Inventors | Filing Date | Serial or Patent No. |
|---|---|---|---|---|
| 249/300 | Gas Laser Discharge Unit | Claus Strowitzki and Hans Kodeda | Feb. 22, 2000 | 09/510,539 |
| 249/302 | Dedusting Unit for a Laser Optical Element of a Gas Laser and Method for Assembling | Claus Strowitzki | Feb. 22, 2000 | 09/510,667 |
| 249/303 | Shadow Device for A Gas Laser | Claus Strowitzki And Hans Kodeda | Feb. 22, 2000 | 09/510,017 |
| 249/304 | Modular Gas Laser Discharge Unit | Claus Strowitzki and Hans Kodeda | Feb. 22, 2000 | 09/510,538 |
| 250/001 | Adjustable Mounting Unit for an Optical Element of a Gas Laser | Hans Kodeda, Helmut Frowein, Claus Strowitzki and Alexander Hohla | Feb. 22, 2000 | 09/511,648 |
| 250/002 | An Optical Element Holding and Extraction Device | Hans Kodeda and Helmut Frowein | Feb. 22, 2000 | 09/510,666 |

All of the foregoing applications are incorporated by reference as if fully set forth herein.

SUMMARY OF THE INVENTION

An object of the present invention is to provide a gas laser and a dedusting unit thereof wherein a continuous circulation of the gas flow within the gas laser is achieved while the gas laser has a reduced, very compact size.

According to the present invention, the gas laser comprises a tube containing a gas mixture including a laser gas and possibly a buffer gas. The tube preferably comprises a cylindrical inner wall. An elongated high voltage electrode is disposed within the tube and extends parallel to the longitudinal axis of the tube. An elongated ground electrode is also disposed within the tube and extends parallel to the high voltage electrode. The ground electrode is spaced apart from the high voltage electrode to thereby define a gas discharge gap therebetween. A circulation means, such as a fan, is positioned within the tube for generating a gas flow within the tube that passes between the electrodes. And, a dedusting unit is mounted along the inner cylindrical wall of the tube in such a manner that a bypass flow which is a part of the gas flow within the tube passes through the dedusting unit.

The elongated high voltage electrode and ground electrode are preferably mounted on the same electrode plate to thereby form a modular discharge unit. The discharge unit may then be removably inserted into the tube.

By passing only a portion of the gas flow within the laser tube through the dedusting unit, turbulences within the circulating gas are avoided, resulting in a continuous gas circulation within the tube during the laser operation. Therefore, the electrical gas discharge gap between the two electrodes is provided with a continuous gas flow to achieve an effective ionization of the laser gas.

Additionally, since the dedusting unit is mounted along the inner cylindrical wall of the tube, the structural size of the gas laser may be reduced over prior art designs. In a particular preferred embodiment of the present invention, the dedusting unit is directly mounted to and integrated within the tube to provide a compact and operationally efficient gas laser. The centrifugal force of the bypass gas flow towards the inner cylindrical tube wall adjacent to the dedusting unit, helps to effectively dispose the dust particles at this cylindrical wall portion, without deflecting this flow in an undesired direction. Because the dedusting unit charges the dust particles electrostatically, they remain adhered to the cylindrical wall portion of the tube.

Preferably, the inner cylindrical wall of the tube is circular in cross section. This allows the gas flow to efficiently circulate within the tube during the laser operation at a uniform velocity of gas flow.

In a preferred embodiment of the invention, the dedusting unit comprises a partition wall that has a substantially circular middle section extending substantially parallel to the inner cylindrical wall. The arrangement and design of the partition wall enables the gas flow to exactly control the bypass flow between the partition wall and the inner cylindrical wall for dedusting the bypass flow. For effective dedusting, it is sufficient if only a minor part of the whole gas flow is directed through the dedusting unit.

The bypass flow is directed through a mouth portion having a substantially constant cross section and a defined orientation with respect to the partition wall and the inner cylindrical wall, so that an efficient and uniform dedusting of the bypass flow is secured. The remaining, or main, gas flow is guided along the side of the partition wall facing away from the inner cylindrical wall. This main gas flow is continuously supplied together with the joining dedusted bypass flow to the circulation means. The circulation means again circulates the gas through the discharge gap and then through the dedusting unit where it is once again divided into a mainflow and bypass flow for dedusting the same.

The dedusting unit preferably includes a U-shaped channel extending parallel to the electrodes and having perforated walls that allow the bypass flow to penetrate the wall of the U-shaped channel. The U-shaped channel may be compactly formed and can be easily mounted to the dedusting unit. The perforated walls of the U-shaped channel enhance the electrostatic field charging of the dust particles electrostatically for adhering to the inner tube wall.

To form an inhomogeneous electrical field within the dedusting unit for electrostatically charging the dust particles, a high voltage wire may extend lengthwise between the two adjacent walls of the U-shaped channel and be supplied with a high positive voltage. Therefore, the dust particles of the bypass flow are electrostatically charged and attracted by the grounded inner cylindrical wall of the tube so that the bypass flow is reliably filtered within the dedusting unit.

For improved efficiency of dedusting the bypass flow, a plurality of U-shaped channels may extend along the length of the tube in a parallel, spaced-apart relationship with each other. Further, a high voltage wire may be disposed between the walls of one or more of the U-shaped channels. Therefore, the dust particles are electrostatically charged at several locations within the dedusting unit and captured along the whole inner cylindrical wall in the region of the dedusting unit. This results in an improved efficiency of the dedusting unit.

In a preferred embodiment of the invention, the electrical gas discharge unit extends along one side of the cylindrical wall while the dedusting unit extends along the opposite side of the cylindrical inner wall. By this arrangement of the gas discharge unit in relation to the dedusting unit, a suitable dedusting effect is achieved, because the timing and the pressure proportions of the gas flow during the laser operation are controlled in such a manner that a sufficiently clear gas flow is supplied to the discharge unit. Additionally, the space within the tube of the gas laser is functionally used for assembling the components of the laser.

Preferably, the circulating means is a radial fan extending along the portion of the cylindrical wall that extends between the discharge unit and the dedusting unit. Therefore, the circulation of the gas flow is optimized and the gas laser can be constructed in such a way that its size is reduced.

In a preferred embodiment of the invention, the outer contour of the discharge unit has a circular section accommodating a section of the radial fan in such a manner that the exhaust side of the radial fan is disposed close to the electrical discharge gap. This allows a sufficient amount of gas flow to be supplied to the electrical discharge gap between the electrodes of the discharge unit, which gas flow has been efficiently cleaned of dust particles in the dedusting unit.

It is preferred, if the gas laser is an excimer laser. Excimer lasers provide high intensity laser radiation in the ultraviolet spectral range. This makes them important tools especially for medical and surgical applications as well as for high-resolution lithography. Excimer lasers are gas discharge lasers that use a rare gas such as argon and a halide gas such as fluor (for example ArF excimer laser) or a gas containing a halide (for example $F_2$) as laser gas. To increase the homogeneity of the gas discharge, in excimer lasers a pre-ionization of the laser gas by pre-ionizers is used. As the used laser gas needs to regenerate before it can be reused, excimer lasers are generally operated in a pulsed operation mode, wherein the laser gas in the discharge gap is being steadily replaced by the circulation means.

The above and other objects, features and advantages of the present invention will become apparent from the following description and the appended claims, taken in conjunction with the accompanying drawings in which like parts ore elements are denoted by like reference signs.

BRIEF DESCRIPTION OF THE DRAWINGS

FIG. 3b shows a front view of the discharge unit of FIG. 3a;

FIG. 3c shows a plan view of the discharge unit of FIG. 3a;

FIG. 5a shows a perspective view of a U-shaped channel of the dedusting unit illustrated in FIG. 2; and FIG. 5b shows an end view of a U-shaped channel of the dedusting unit illustrated in FIG. 2.

DETAILED DESCRIPTION OF THE PREFERRED EMBODIMENT

A preferred embodiment of the invention will now be described with reference to the attached drawings.

Figure 1:
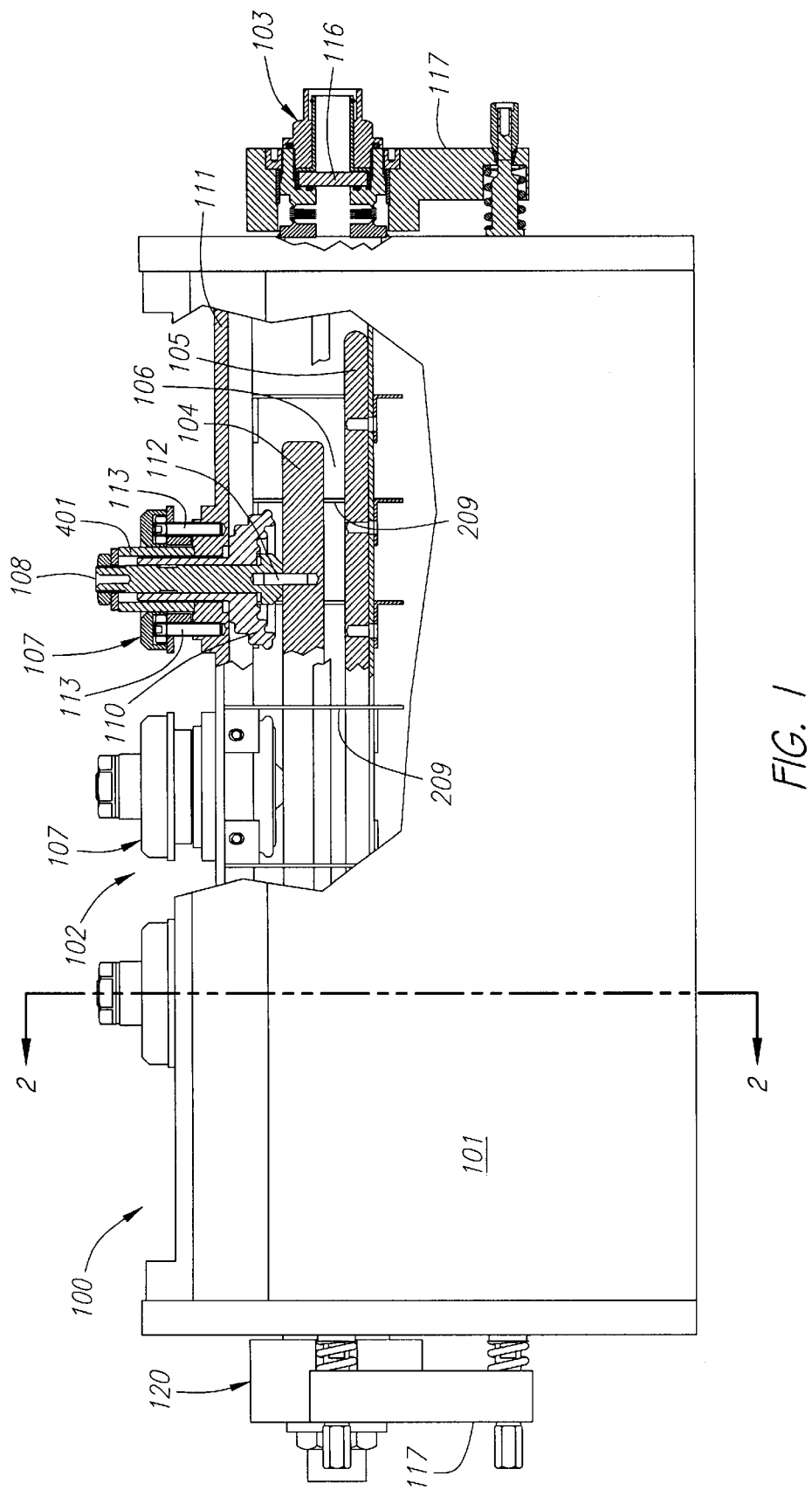
FIG. 1 is a partial cut-away side view of an excimer laser according to a preferred embodiment of the invention.
Figure 2:
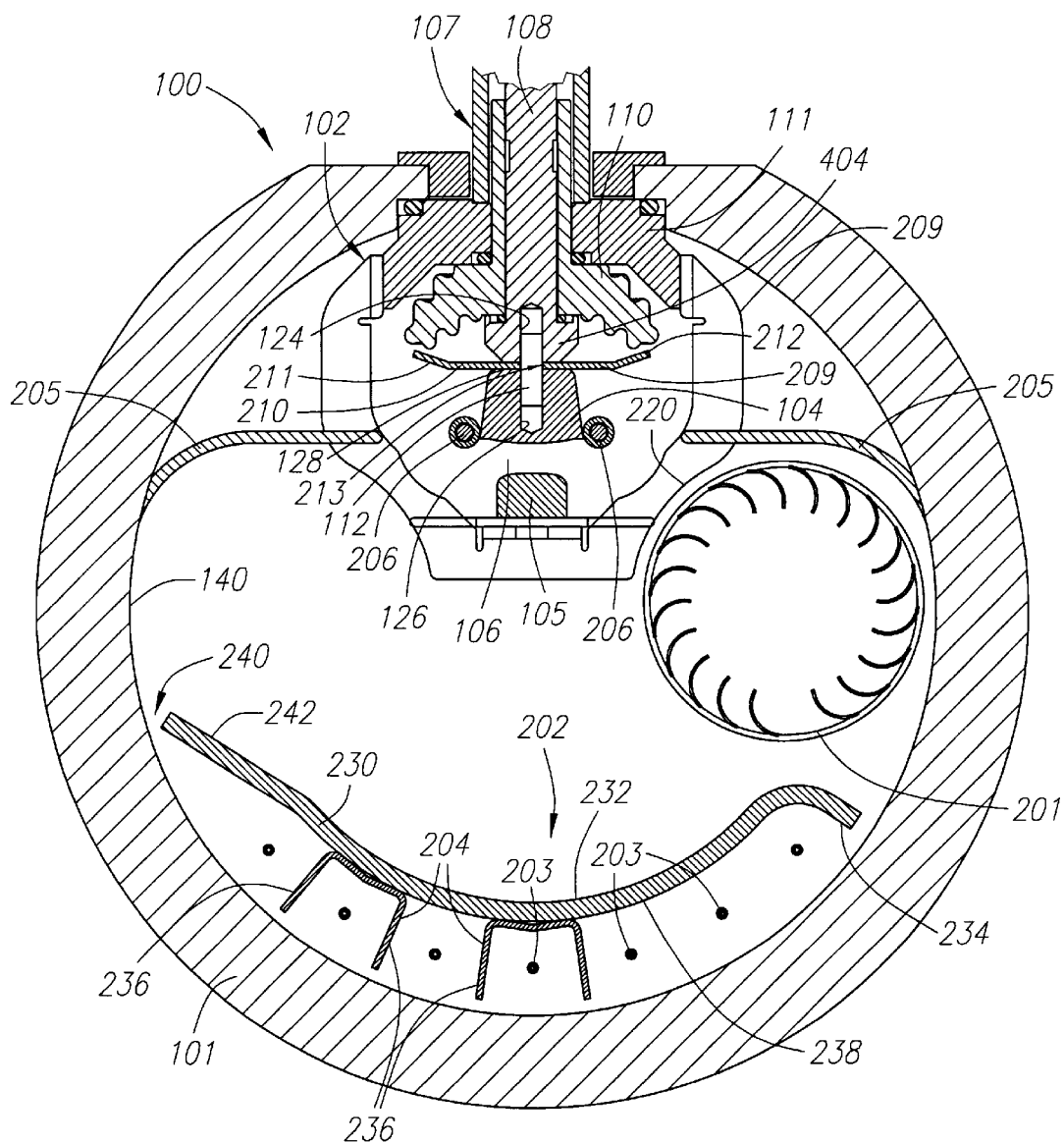
FIG. 2 is a cross-sectional view of the excimer laser in FIG. 1 along Line 2–2.

As shown in FIGS. 1 to 2, a gas laser 100 according to the preferred embodiment of the invention comprises a tube 101, a discharge unit 102 inserted into the tube 101, a circulation means 201, such as a radial fan, for generating a gas flow within the tube 101, and a dedusting unit 202 for dedusting the gas flow. The tube 101 contains a gas mixture including a laser gas and preferably a buffer gas. During operation, the gas mixture is circulated by the radial fan 201 within the tube 101. As is known in the art, gas laser 100 may also comprise means for cooling the laser gas, such as a gas cooler, within laser tube 101.

The circulation means 201 is preferably a radial fan, but other means known for circulating lasing gases in gas lasers may also be used in connection with the invention.

The discharge unit 102 is preferably mounted as a modular unit into the tube 101 and comprises a high voltage electrode 104 and the ground electrode 105. The high voltage electrode 104 and the ground electrode 105 are spaced apart from each other, thereby defining a gas discharge gap 106. A high voltage is applied to the high voltage electrode 104 via a plurality of high voltage ducts 107, which carry the high voltage electrode 104. Each high voltage duct 107 comprises a conductive core 108 and an insulator element 110 arranged around the conductive core 108. Each high voltage duct 107 is attached to the high voltage electrode 104. The high voltage ducts may be attached to the high voltage electrode using any suitable fastener. For example, a double threaded stud 112 may be used to attach electrode 104 to each conductive core 108 of each duct 107.

Furthermore, discharge unit 102 is provided with an elongated electrode plate 111. The electrode plate 111 includes holes, through which the high voltage ducts 107 extend so as to be connected to the high voltage electrode 104. Each high voltage duct 107 is fixed to the electrode plate 111 by a suitable attachment means, such as bolts 113. Those skilled in the art will appreciate, however, that any suitable attachment means may be used to fix ducts 107 to electrode plate 111.

The ground electrode 105 is carried by, or mounted to, the electrode plate 111 via a plurality of flow guides 209, which will be referred to again later.

The insulator elements 110 are preferably made of a ceramic material. Optionally, however, they may be made from other insulative materials, including, for example, a fluoride material. They preferably have a shape that conically expands towards the high voltage electrode 104 and comprise a corrugated surface, so as to increase a creepage path extending along said surface. This helps to prevent surface flashover between the high voltage electrode 104 and the grounded electrode plate 111.

As illustrated in FIG. 2, discharge unit 102 also preferably comprises a shadow plate 210 disposed between the gas discharge gap 106 and the insulator element 110 for protecting the insulator element 110 against the corrosive effect of the laser gas and of the laser radiation. Shadow plate 210 is preferably made out of a metal, such as aluminum.

In the present embodiment, shadow plate 210 is interposed between the high voltage electrode 104 and insulator element 110 of the ducts 107. Preferably shadow plate 210 extends along the entire gas discharge gap 106 and is mounted in such a manner that it at least partially shields the insulator element against the laser radiation irradiated from the gas discharge gap 106.

Figure 3B:
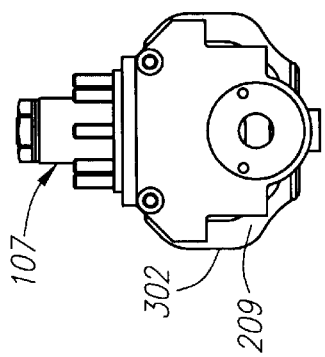
Figure 3A:
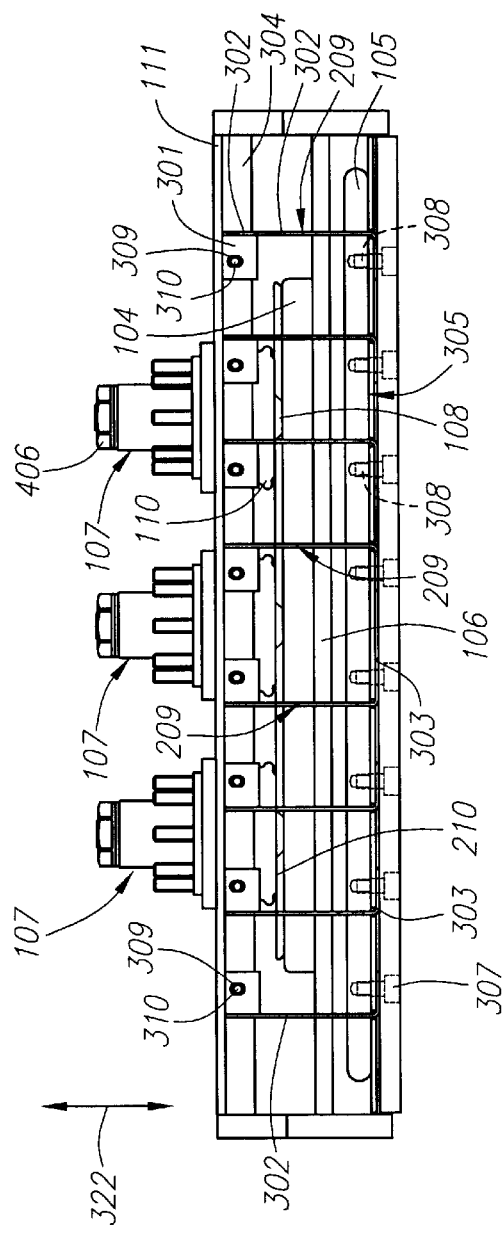
FIG. 3a shows a side view of a discharge unit according to a preferred embodiment of the invention.

Referring to FIGS. 2 and 3a, shadow plate 210 preferably has an elongated sheet-like shape and comprises a central portion 209, a first edge portion 211 and a second edge portion 212. The central portion 209 extends longitudinally in a direction parallel to the gas discharge gap 106 and perpendicular to the cores 108 of the high voltage ducts 107. The edge portions 211 and 212 are located at the longitudinal edges of the shadow plate 210 and are, with respect to the central portion 209, preferably bent towards the insulator elements 110 by a small angle of about 20 degrees. Although shadow plate 210 is preferably elongated as described above, it may have a variety of other shapes as well. For example, a plurality of shadow plates 210 could be used instead of one elongated shadow plate that extends the length of the discharge gap. In such a case, the shadow plates would preferably be circular and have a cross-sectional appearance consistent with that shown in FIG. 2. Thus, a circular shadow plate 210 could be interposed between the electrode 104 and each insulator element 110 of the high voltage ducts 107.

The type of laser gas employed may also affect the shape of the shadow plate 210. The reason for this is that some laser gases have a substantially lower breakdown voltage than other laser gases. For example, the laser gases used in ArF and KrF excimer lasers have a substantially lower breakdown voltage than the $F_2$ gas used in fluorine gas lasers. Thus, if laser 100 is a fluorine gas laser, then the shadow plate 210 may come much closer to the insulator element 110 than if laser 100 is an ArF or KrF excimer laser. As a result, bending the edges of the shadow plate 210 toward insulator element 110 may be appropriate. On the other hand, bending the edges of shadow plate 210 toward the insulator element for other excimer lasers may be inappropriate. Indeed, for example, with ArF, KrF, and other excimer lasers employing laser gases with relatively low breakdown voltages, it may be advantageous to bend the edges of the shadow plate away from the insulator element 110 to help ensure that current does not jump the gap between the shadow plate and insulator element. However, this of course, will depend on how far the shadow plate 210 is spaced from the insulator element 110 and the breakdown voltage of the laser gas being used. Similarly, the greater the breakdown voltage of the laser gas, the smaller the diameter of the conical portion of the insulator element 110 may be.

As best seen in FIG. 2, the shadow plate 209 may be interposed between the high voltage electrode 104 and inner ends 404 of the cores 108 of the high voltage ducts 107 so that the longitudinal axis of the central portion 209 (or center in the case of a circular shadow plate) coincides with the central axis of the high voltage electrode 104.

Although shadow plate 210 is preferably interposed between high voltage electrode 104 and inner ends 404 of the cores 108 as illustrated in FIG. 2, as those skilled in the art will appreciate, the shadow plate 210 will serve its desired function so long as it is interposed between the discharge gap 106 and insulator elements 110. Thus, the positioning of shadow plate 210 is not limited to the position illustrated in FIG. 2.

Shadow plate 210 may be interposed between electrode 104 and cores 108 by providing central portion 209 with a plurality of holes 213, preferably along the longitudinal axis of the central portion 209, and then attaching high voltage electrode 104 to the cores 108 through holes 213 using a suitable fastener. Thus, the spacing and the number of holes 213 correspond to the spacing and the number of high voltage ducts 107. In the present embodiment, stud bolts 112 with threads on both ends are used to attach electrode 104 to cores 108. One end of the stud bolt 112 is inserted into a threaded hole 124 provided in the respective core 108. The second end of the stud bolt 112 is inserted into a further threaded hole 126 provided in the mating face 128 of the high voltage electrode 104 that faces the inner end 404 of core 108 and the shadow plate 210. If a circular shadow plate is used, each shadow plate will be provide with a single hole 213 in the center of the shadow plate and one shadow plate will be used for each high voltage duct employed in the laser.

The shadow plate 210 preferably has a flow-guiding shape to help guide the lasing gas mixture into the gas discharge gap 106.

A preferred manner of assembling the electrode arrangement of the present invention with the shadow plate is now described.

First one end of a stud bolt 112 is screwed into each of the threaded holes provided on the mating face 128 of the high voltage electrode 104, such that the other end of each stud bolt 112 stands out of the mating face 128. Then the shadow plate 210 is arranged on the mating face 128 of the high voltage electrode 104 so that the stud bolts 112 are inserted into the holes 213 in the shadow plate 210. Alternatively, if a circular shadow plate is used, then one shadow plate 210 will be inserted over each of the stud bolts 112. After the shadow plate 210 is in place, a core 108 of the high voltage ducts 107 is lowered upon the shadow plate 210 such that the end of one of the stud bolts protruding from the electrode partially enters the threaded hole 124 provided in the inner end 404 of the core 108 of the high voltage duct 107. Subsequently the core 108 is rotated around its longitudinal axis, i.e. around the longitudinal axis of the stud bolt 112, so as to screw the core 108 onto the stud bolt 112. As a result, the core 108 is lowered onto the shadow plate 210, and the shadow plate 210 is finally held between the upper face 128 of the high voltage electrode 104 and the inner end 404 of the core 108. Additional high voltage ducts 107 comprising cores 108 are attached to the remaining stud bolts 112 in the same way as described above.

In the case of an elongated shadow plate, before the cores 108 are tightly screwed to the stud bolts 112, at least two of the cores 108 are loosely screwed to their corresponding stud bolt 112. Then, after the shadow plate 210 is correctly positioned, all of the cores 108 are screwed down tightly to lock shadow plate 210 in place.

Adjacent to the high voltage electrode 104, two pre-ionizers 206 are provided, which serve to pre-ionize the laser gas to ensure greater homogeneity of the gas discharge in the discharge gap 106.

The pre-ionizers 206 are preferably corona-type pre-ionizers and extend substantially parallel to said high voltage electrode. The pre-ionizers 206 have a coaxial shape with a conductive core surrounded by a tube shaped insulator.

The corona-type pre-ionizers can be mounted immediately adjacent to the high voltage electrode. In particular, as shown in FIG. 2, the corona-type pre-ionizers should be mounted at the opposing edges of the high voltage electrode so that it is disposed adjacent the electrode face of the high voltage electrode facing the ground electrode.

Although corona-type pre-ionizers are preferred for use as pre-ionizers 206 in connection with the present invention, those skilled in the art will recognize that any of the pre-ionizers known in the art may be used. Furthermore, the insulator of the pre-ionizers is preferably a ceramic material such as alumina. It can also be a fluoride material. Alternatively, any other kind of known pre-ionizer can be used. The pre-ionizers are not necessary for the discharge unit to work. Indeed, excimer lasers were known before the invention of pre-ionizers. Pre-ionization, however makes the gas discharge between the high voltage electrode and the ground electrode more homogeneous and thus more reliable.

Although high voltage electrode 104 and ground electrode 105 are preferably mounted on an electrode plate to form a modular discharge unit, the present invention is not so limited. As those skilled in the art will appreciate, a variety of techniques have been used for mounting an elongated high voltage electrode and an elongated ground electrode in a parallel, spaced-apart relationship in a gas laser tube so as to define a gas discharge gap therebetween. Those skilled in the art will appreciate that these other techniques may also be employed in connection with the present invention.

During operation, an electrical gas discharge occurs within the gas discharge gap 106, between the electrodes 104, 105, which in turn generates laser light. The gas flow generated by the radial fan 201 passes between the two electrodes 104, 105, thereby continuously supplying fresh lasing gas to the gas discharge gap 106.

Referring to FIG. 2, the discharge unit 102 and the dedusting unit 202 preferably extend along opposite sides of an inner wall 140 of the tube 101. Inner wall 140 is preferably cylindrical so that it is circular in cross section over the entire length of tube 101. The radial fan 201 is mounted along a portion of the inner cylindrical wall 140 that extends between the discharge unit 102 and the dedusting unit 202. To help reduce the size of laser unit 100, discharge unit 102 is preferably dimensioned to accommodate a section of the radial fan 201 in such a manner that the exhaust side of the radial fan 201 may be disposed in close proximity to the gas discharge gap 106. For example, in the present embodiment, flow guides 209 are provided with a concaved arcuate section 220 so that the exhaust side of radial fan 201 may be located in close proximity to discharge gap 106.

Laser unit 100 is also preferably provided with two curved elongated guiding plates 205. Curved plates 205 are symmetrically attached to the inner tube wall 140 at opposite sides of the tube 101. The guiding plates 205 are elongated in the longitudinal direction of the tube 101. Further, as illustrated in FIG. 2, guiding plates 205 are curved to guide gas exiting from the exhaust side of fan 201 through the gas discharge gap 106 and then recirculate the gas back to the inlet side of fan 201.

The dedusting unit 202 comprises an elongated partition wall 230 that has a substantially circular middle section 232 extending substantially parallel to the inner cylindrical wall 140. The end 234 of the partition wall 230 extending to the exhaust side of the dedusting unit 202 is bent toward the inner cylindrical wall 140 of the tube 101. A plurality of elongated U-shaped channels 204 are mounted in a parallel, spaced apart relationship with each other on the convex side 238 of the middle section 232 of partition wall 230. As a result, the legs 236 of the U-shaped channels 204 extend in a direction parallel to the electrodes 104, 105 of the discharge unit 102. As best seen in FIG. 5a, legs 236 of U-shaped channels 204 comprise a perforated wall. A high voltage wire 203 preferably extends between the two perforated walls 236 of each U-shaped channel 204 and between the perforated walls 236 of adjacent U-shaped channels 204.

In operation of the gas laser according to the preferred embodiment of the present invention, the radial fan 201 generates a gas flow which extends along the guiding plate 205 and passes the gas discharge gap 106 between the high voltage electrode 104 and the ground electrode 105 to ionize the laser gas and generate an electrical gas discharge for generating laser light. The gas flow then proceeds from the gas discharge gap 106 along the second guiding plate 205 and then along the inner cylindrical wall 140 of the tube 101 toward the dedusting unit 202 disposed on the opposite side of the tube 101 from the discharge unit 102. A bypass flow which is a part of the gas flow within the tube 101 passes through the inlet portion 240 of the dedusting unit 202 defined between the partition wall 230 and the inner cylindrical wall 140. The end 242 of the partition wall 230 extending to the inlet side of the dedusting unit 202 is slightly inclined toward the inner cylindrical wall 140 of the tube 101. The bypass flow strikes against and penetrates the perforated walls 236 of the elongated U-shaped channels 204. As a result, the dust particles contained in the bypass flow are electrostatically charged by the high voltage wires 203, which thereby cause the dust particles to be diverted toward the inner cylindrical wall 140. Bending the exhaust end 234 of the partition wall 230 toward cylindrical wall 140 is beneficial because it also helps direct the flow of the charged dust particles toward the cylindrical wall 140 where they will adhere.

The cleaned bypass flow is exhausted at the bent end 234 of the partition wall 230 and then rejoined with the main gas flow which is guided along the side of the partition wall 230 facing away from the inner cylindrical wall 140. The main gas flow and bypass gas flow are rejoined at the outlet side of the deduster 202 where the joined flows are then fed to the radial fan 201.

By passing only a minor portion of the gas flow within the tube 101 through the dedusting unit 202, the circulation of the gas within laser tube 101, and within the gas discharge gap 106 in particular, is not subjected to turbulences. As a result, a continuous gas circulation exhibiting little or no turbulence within the tube 101 during laser operation may be provided. Accordingly, the electrical gas discharge gap 106 between the two electrodes 104, 105 is provided with a continuous gas flow to achieve an effective ionization of the gas mixture.

Because gas flow is continuous during operation, it has proved to be sufficient to pass only a minor bypass flow through the dedusting unit to achieve sufficient dedusting of the whole gas content within the tube.

Figure 3C:
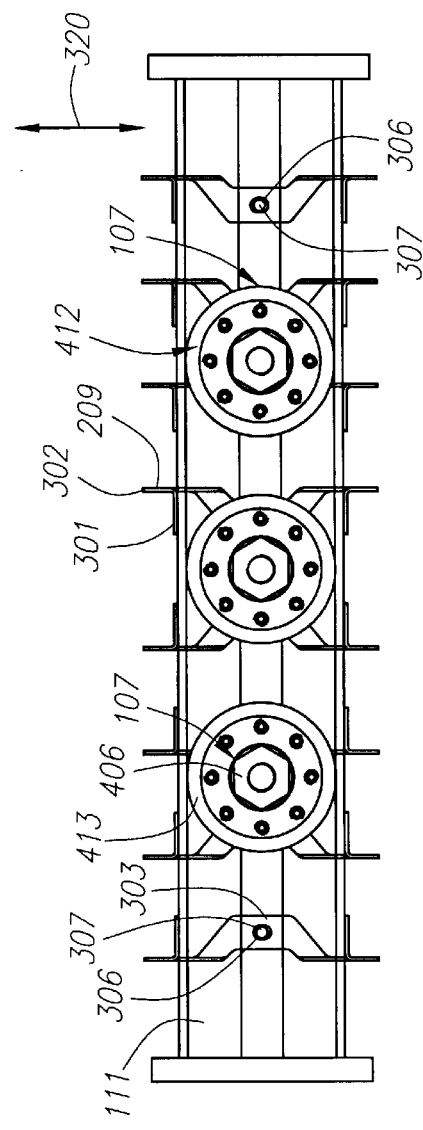

Referring to FIGS. 3a and 3c the discharge unit 102 comprises three coaxial waveguide-like high voltage ducts 107, extending through holes in the electrode plate 111. The ducts 107 are arranged spaced apart from each other. The holes and the ducts 107 have a circular cross section, as can be seen from FIG. 3c. Each of the three ducts 107 is inserted into the respective hole in the electrode plate 111 with a defined tolerance between the insulator element and the hole. As those skilled in the art will appreciate, the number of ducts employed in a particular gas laser 100 will depend on the overall length of the laser.

The ground electrode 105 is preferably carried by, or mounted to, the electrode plate 111. As best seen in FIGS. 2 and 3a, preferably a plurality of flow guides 209 are used for this purpose.

The flow guides 209 are preferably made from sheets of metal that extend between the electrode plate and the ground electrode in a plane perpendicular to the longitudinal axis of the electrodes 104, 105. The flow guides 209 comprise respectively an upper flange 301, a lower flange 303, and a central flow-guiding portion 302 integrally connecting said upper flange 301 to said lower flange 303. Said upper and lower flanges 301, 303 extend perpendicular to each other and to said central flow-guiding portion 302. The upper flange 301 is attached to a side face 304 of electrode plate 111, and the lower flange 303 is attached to a bottom face 305 of the ground electrode 105. The central flow-guiding portion 302 is preferably aerodynamically profiled in order to minimize flow resistance and turbulences for maintaining a substantially laminar gas flow between the flow guides.

The lower flange 303 preferably includes an oblong hole 306 (shown only at part of the flow guides 209). Hole 306 is oblong in a direction perpendicular to the longitudinal axis of the elongated ground electrode 105. A screw, or other fastening means, 307 is inserted through the hole 306 into a mating threaded hole 308 being provided in the ground electrode 105. The oblong hole 306 allows for adjustments of the ground electrode 105 with respect to the high voltage electrode 104 essentially in the direction indicated by the double-headed arrow 320 in FIG. 3c.

The upper flange 301 preferably includes an oblong hole 309. Hole 309 being oblong in a direction perpendicular to the longitudinal axis of the electrode plate 111. A screw, or other fastening means, 310 is inserted through the hole 309 into a mating threaded hole 311 being provided in the high voltage electrode 104. The oblong hole 309 allows an adjustment of the ground electrode 105 with respect to the high voltage electrode 104 essentially in the direction indicated by the double-headed arrow 322 in FIG. 3a.

Figure 4:
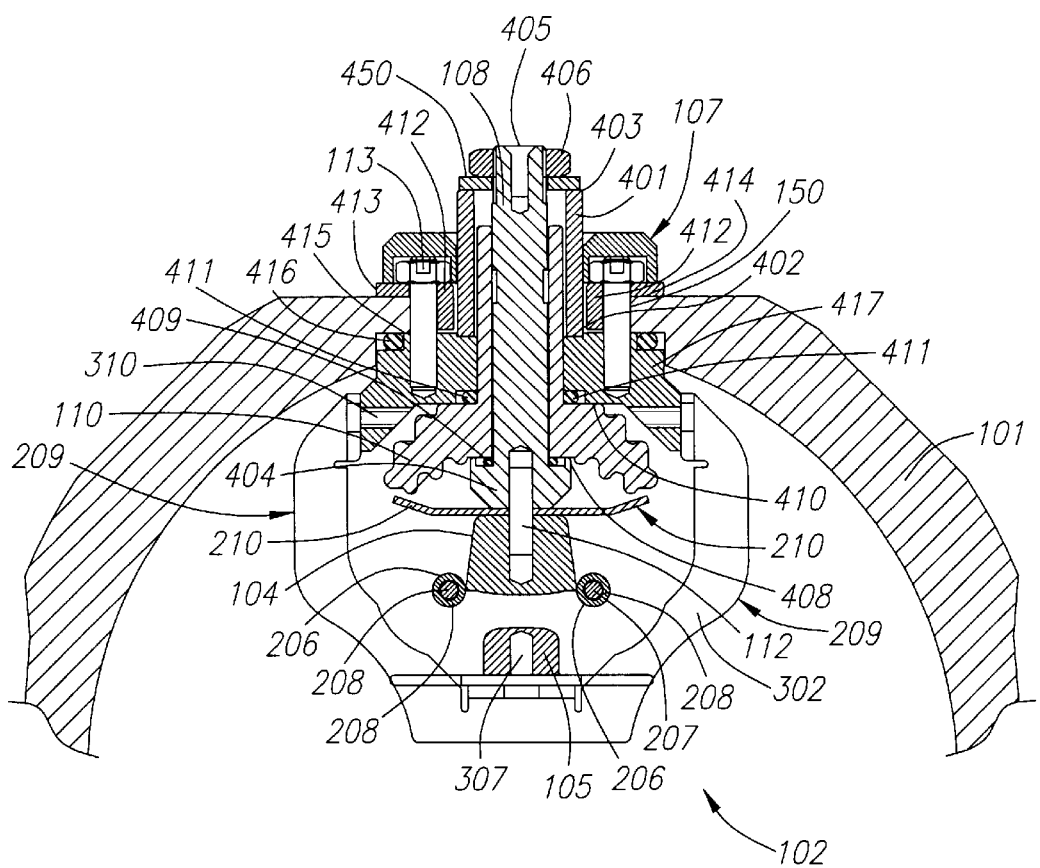
FIG. 4 shows a detailed cross section of the discharge unit according to a preferred embodiment of the invention.

FIG. 4 shows a cross section of the discharge unit 102 according to the preferred embodiment of the invention. In particular, FIG. 4 shows an enlarged cross-sectional view of the discharge unit shown in FIG. 2. The angle of view is the same as in FIG. 3b.

Each high voltage duct 107 of the laser discharge unit 102 preferably further comprises a sleeve 401 enclosing the core 108 and insulator 110. Sleeve 401 has an inner end 402 supported by the electrode plate 111, and an outer free end 403. The core 108 has an inner end 404 connected to the high voltage electrode 104 and a threaded outer free end 405 extending beyond the free end 403 of the sleeve 401. A nut 406 may be screwed onto the threaded end 405 as shown in FIGS. 3c and 4, thereby pressing the sleeve 401 against the electrode plate 111 and tensioning the core 108 by pulling it. Preferably a washer 450 is interposed between nut 406 and sleeve 401 to evenly distribute the stresses applied by nut 406 to sleeve 401. A threaded stud bolt 112 is used to connect the inner end 404 of the core 108 to the high voltage electrode 104.

The inner end 404 of the core 108 is provided with a core ring shoulder 408, which is pressed against the ceramic insulator element 110 when core 108 is placed under tension. A seal 409 is preferably provided between the ring shoulder 408 and the ceramic insulator element 110.

The ceramic insulator element 110 is also caused to be pressed against the electrode plate 111 by means of the tensioned core 108 via the core ring shoulder 408 at the inner end 404 of the core 108. Preferably a ring shoulder 410 is provided on the insulator element 110 and another seal 411 is provided between the ceramic insulator ring shoulder 410 and the electrode plate 111.

To provide additional sealing, a sealing ring 412 (see also FIGS. 2 and 3c) preferably surrounds each sleeve 401. Sealing ring 412 may be constructed to have a flange 413 at its outer circumference. Flange 413 is dimensioned so that it is supported by an outer rim 414 of the holes 150 in the tube 101 through which the respective ducts 107 are inserted. Electrode plate 111 is then preferably provided with a ring shoulder 417 facing an inner rim 415 of the tube 101. A metal seal 416 is preferably interposed between shoulder 417 and rim 415. As a result, when the ring 412 and the electrode plate 111 are connected by screws 113 a gas tight seal is provided between the shoulder 417 and the inner rim 415 of the tube 101.

All of the seals 409, 411 and 416 are ring-shaped metal seals in the present embodiment. However, those skilled in the art will appreciate that the invention is not limited to using ring-shaped seals.

As shown in FIG. 1, laser 100 typically further comprises a front optical element 116, through which the laser beam emits. Optical element 116 may be provided, for example, in an optical system 103 that includes an adjustable mounting means 117 for adjusting the position of the optical element 116 in relation to the tube 101. Rear laser optical system 120 similarly includes an optical element 116 (not shown) and adjusting means 117. However, the optical element 116 of the rear laser optical system 120 comprises a totally reflective mirror rather than a partially reflective mirror. As those skilled in the art will appreciate, front and rear optical elements 116 may also be mounted directly in the end walls of the laser tube 101. Alternatively, they may be mounted on adjustable mounting brackets that are separate from the laser tube 101 as is known in the art. A suitable laser optics system and an adjustable mounting means for use in connection with the present invention as front and rear optical systems 103, 120 are described in concurrently filed applications bearing attorney docket nos. 250/001 and 250/002, which are hereby incorporated by reference. The filing details of these applications are provided above.

Having now fully described the invention, it will be apparent to one of ordinary skill in the art that many changes and modifications can be made thereto without departing from the spirit and scope of the invention as set forth herein.

We claim:

1. A gas laser comprising:
   a tube containing a gas mixture including a laser gas, the tube comprising a cylindrical inner wall;
   a discharge unit disposed in said tube and having two elongated electrodes defining an electrical gas discharge gap therebetween for providing an electric gas discharge between said electrodes which generates laser light;
   a circulation means disposed within said tube creating a gas flow substantially transverse to said electrodes; and
   a dedusting unit mounted along the inner cylindrical wall of the tube such that a portion of the gas flow within the tube, passes through the dedusting unit;
   wherein the dedusting unit comprises an elongated U-shaped channel extending parallel to the electrodes, the two opposing walls of the U-shaped channel being perforated and disposed substantially transverse to the direction of the portion of the gas flow within the dedusting unit.

2. The gas laser of claim 1 wherein the dedusting unit comprises an elongated partition wall having a substantially circular middle section extending substantially parallel to the inner cylindrical wall.

3. The gas laser of claim 2 wherein one end of the elongated partition wall is bent toward the inner cylindrical wall.

4. The gas laser of claim 1 wherein the dedusting unit includes a high voltage wire extending between the two walls of the U-shaped channel.

5. The gas laser of claim 4 wherein the dedusting unit comprises a plurality of elongated U-shaped channels extending parallel to the electrodes in a spaced-apart relationship to each other.

6. The gas laser of claim 5 wherein a high voltage wire is disposed between the walls of two adjacent U-shaped channels.

7. The gas laser of claim 6 wherein the inner cylindrical wall of the tube has a circular cross-section, and the dedusting unit comprises an elongated partition wall having a substantially circular middle section extending substantially parallel to the inner cylindrical wall.

8. The gas laser of claim 1 wherein the inner cylindrical wall of the tube has a circular cross section, and the electrical gas discharge unit extends along one side of the cylindrical wall while the dedusting unit extends along the opposite side of the cylindrical wall.

9. The gas laser of claim 8 wherein the circulating means comprises a radial fan extending along the portion of the cylindrical wall which extends between the discharge unit and the dedusting unit.

10. The gas laser of claim 9 wherein the radial fan is positioned within the tube so that the exhaust side of the radial fan is disposed proximately to the electrical discharge gap.

11. The dedusting unit of claim 1 wherein the gas laser is an excimer laser.

12. The gas laser of claim 1 wherein the dedusting unit includes an inlet port and an outlet port, the inlet port being dimensioned so that the portion of the gas flow within the tube passes through the inlet port into the dedusting unit.

13. A dedusting unit for a gas laser, the gas laser comprising a tube within which a gas flow is provided between a high voltage and ground electrode, the dedusting unit comprising:
   a plurality of substantially parallel, perforated walls;
   wherein the walls are legs of a U-shaped channel; and
   wherein the plurality of walls are dimensioned such that the dedusting unit is positionable within the tube with the plurality of perforated walls extending parallel to the electrodes and at least a portion of the gas flow passing through the plurality of perforated walls.

14. The dedusting unit of claim 13 further comprising a high voltage wire extending between the two walls of the U-shaped channel.

15. The dedusting unit of claim 14 further comprising a plurality of U-shaped channels extending in a parallel and spaced-apart relationship to each other.

16. The dedusting unit of claim 15 further comprising a high voltage wire disposed between the walls of two, adjacent U-shaped channels.

17. The dedusting unit of claim 13 wherein the dedusting unit is adapted to be mounted to a cylindrical inner wall of the tube.

18. The dedusting unit of claim 13 wherein the dedusting unit comprises an elongated partition wall having a substantially circular middle section adapted to extend substantially parallel to an inner cylindrical wall of the tube, and wherein the U-shaped channel is mounted on the convex, side of the partition wall.

19. The dedusting unit of claim 18 wherein a high voltage wire extends between the walls of the U-shaped channel.

20. The dedusting unit of claim 19 further comprising a plurality of U-shaped channels that extend in a parallel, spaced apart relationship to each other.

21. The dedusting unit of claim 20 further comprising a high voltage wire disposed between the walls of two adjacent U-shaped channels.

22. The dedusting unit of claim 18 wherein one end of the elongated partition wall is bent toward the inner cylindrical wall of the tube.

23. The dedusting unit of claim 13 wherein the gas laser is an excimer laser.

* * * * *